(12) United States Patent
Yamada et al.

(10) Patent No.: US 6,275,711 B1
(45) Date of Patent: Aug. 14, 2001

(54) METHOD AND APPARATUS FOR SELECTING A BASE STATION IN CDMA DIVERSITY HANDOVER

(75) Inventors: Daisuke Yamada, Inagi; Osamu Kato, Yokohama, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/077,289

(22) PCT Filed: Oct. 17, 1997

(86) PCT No.: PCT/JP97/03762

§ 371 Date: May 28, 1998

§ 102(e) Date: May 28, 1998

(87) PCT Pub. No.: WO94/21057

PCT Pub. Date: Sep. 15, 1994

(30) Foreign Application Priority Data

Oct. 18, 1996 (JP) .................................................. 8-295926

(51) Int. Cl.[7] .................................................. H04B 7/05
(52) U.S. Cl. ........................... 455/522; 455/33.1; 455/69; 455/517; 375/219; 375/220; 570/342; 570/335
(58) Field of Search ........................... 455/33.1, 34, 54, 455/56, 522, 62, 63, 65, 67–69, 89, 393, 226, 161, 517; 370/450, 18, 19, 20, 21, 22, 342; 375/335, 11, 12, 15, 90, 100, 102, 205, 206, 219–200

(56) References Cited

U.S. PATENT DOCUMENTS

| | | | |
|---|---|---|---|
| 5,200,957 | * | 4/1993 | Dahlin ................................ 370/100.1 |
| 5,212,803 | * | 5/1993 | Uddenfeldt et al. ................ 455/33.1 |
| 5,420,850 | * | 5/1995 | Umeda et al. ........................ 370/18 |

(List continued on next page.)

FOREIGN PATENT DOCUMENTS

| | | |
|---|---|---|
| 0160993 | 11/1985 | (EP) . |
| 160993 | 11/1985 | (EP) . |
| 2297885 | 8/1996 | (GB) . |

(List continued on next page.)

OTHER PUBLICATIONS

English Language Abstract of JP 8–289366.
Copy of an International Search Report issued with PCT/JP97/03762.
A Japanese Language abstract of JP 8–223107.
A Japanese Language abstract of JP 63–223623.
A Japanese Language abstract of JP 7–131400.
A Japanese Language abstract of JP 7–298322.
A Japanese Language abstract of JP 7–162936.
A Japanese Language abstract of JP 8–88877.
A Japanese Language abstract of JP 8–18503.
A Japanese Language abstract of JP 8–186857.
A Japanese Language abstract of JP 7–298333.
A Japanese Language abstract of JP 7–298334.
A Japanese Language abstract of JP 7–231483.

*Primary Examiner*—Thanh Congle
*Assistant Examiner*—Pablo Tran
(74) *Attorney, Agent, or Firm*—Greenblum & Bernstein, P.L.C.

(57) ABSTRACT

At CRC comprising circuit 21, CRC evaluation results transmitted from base station BS#1 and base station BS#2 are compared. In the case where CRC signals are both OK signals or NG, TPC comprising circuit 22 compares TPC evaluation results i.e. the number of "0" symbols in TPC bits, transmitted from base station BS#1 and base station BS#2. And, in the case of no deference in TPC signals, the number of "0". symbols in TPC bits in earlier several frames is evaluated. According to the method described above, control station MCC selects a base station then obtain an information signal from the base station.

11 Claims, 6 Drawing Sheets

U.S. PATENT DOCUMENTS

| | | | | |
|---|---|---|---|---|
| 5,430,760 | * | 7/1995 | Dent | 375/200 |
| 5,491,717 | | 2/1996 | Hall . | |
| 5,583,852 | * | 12/1996 | Ikeda et al. | 370/335 |
| 5,946,346 | * | 8/1999 | Ahmed et al. | 375/219 |
| 5,946,357 | * | 8/1999 | Sandin et al. | 375/296 |
| 5,960,350 | * | 9/1999 | Schorman et al. | 455/450 |

FOREIGN PATENT DOCUMENTS

| | | | |
|---|---|---|---|
| 60241336 | 11/1985 | (JP) . | |
| 61502576 | 11/1986 | (JP) . | |
| 63233623 | 9/1988 | (JP) . | |
| 0680160 * | 2/1995 | (JP) | H04B/7/005 |
| 7131400 | 5/1995 | (JP) . | |
| 7162936 | 6/1995 | (JP) . | |
| 7231483 | 8/1995 | (JP) . | |
| 7298332 | 11/1995 | (JP) . | |
| 7298333 | 11/1995 | (JP) . | |
| 7298334 | 11/1995 | (JP) . | |
| 8-18503 | 1/1996 | (JP) . | |
| 8-88877 | 4/1996 | (JP) . | |
| 8186857 | 7/1996 | (JP) . | |
| 8223107 | 8/1996 | (JP) . | |
| 8-289366 | 11/1996 | (JP) . | |
| 86/00486 | 1/1986 | (WO) . | |
| 94/21057 | 9/1994 | (WO) . | |

* cited by examiner

| BS1 | FRN#0 | FRN#1 | FRN#2 | FRN#3 | FRN#4 | FRN#5 | FRN#6 | FRN#7 | FRN#8 | FRN#9 |
|---|---|---|---|---|---|---|---|---|---|---|
| | CRC=OK | CRC=OK | CRC=NG | CRC=NG | CRC=OK | CRC=NG | CRC=NG | CRC=OK | CRC=OK | CRC=NG |

10ms

| BS2 | FRN#0 | FRN#1 | FRN#2 | FRN#3 | FRN#4 | FRN#5 | FRN#6 | FRN#7 | FRN#8 | FRN#9 |
|---|---|---|---|---|---|---|---|---|---|---|
| | CRC=OK | CRC=NG | CRC=OK | CRC=NG | CRC=NG | CRC=OK | CRC=OK | CRC=NG | CRC=NG | CRC=NG |

| AFTER DHC | FRN#0 | FRN#1 | FRN#2 | FRN#3 | FRN#4 | FRN#5 | FRN#6 | FRN#7 | FRN#8 | FRN#9 |
|---|---|---|---|---|---|---|---|---|---|---|
| | BS1 | BS1 | BS2 | ? | BS1 | BS2 | BS2 | BS1 | BS1 | ? |

METHOD AND APPARATUS FOR SELECTING A BASE STATION IN CDMA DIVERSITY HANDOVER

TECHNICAL FIELD

The present invention relates to a radio communication system in which DHO (Diversity Hand-Over) Between Cells is executed in a CDMA (Code Division Multiple Access) mobile communication system, more particularly to a radio communication system in which a control station can decide a basic station exactly after DHO Between Cells.

BACKGROUND ART

In a CDMA mobile communication system composed of each of a plurality of cells existing in a divided service area, in the case where a deterioration occurs in received quality at a base station or a mobile station in current communications, the method has been adopted conventionally to improve a received quality by executing DHO Between Cells with a base station in a peripheral cell.

Figure 1:
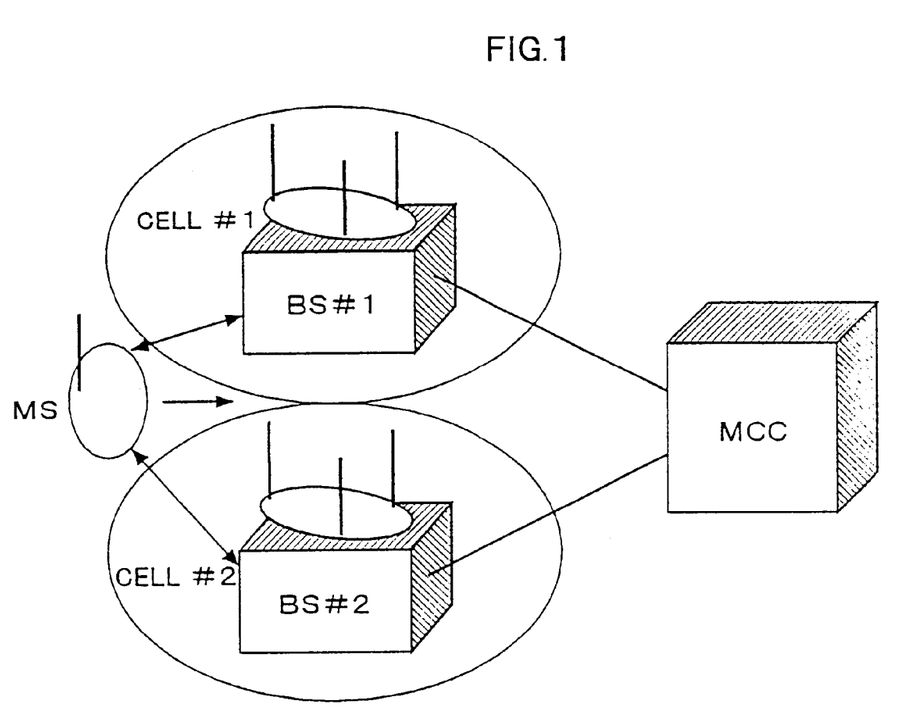
FIG. 1 illustrates a block diagram to explain DHO Between Cells in a CDMA mobile communication system.

A radio communication system in conventional DHO Between Cells is explained. FIG. 1 is a block diagram illustrating a CDMA mobile communication system.

It is assumed that mobile station MS is moving along almost halfway between first cell#1 and second cell#2. At this time, each of base station BS#1 and base station BS#2 respectively directing each cell communicates with mobile station MS under Hand-Over Between Cells condition, and transmits a information signal and a control signal obtained by communicating with mobile station MS respectively at base station BS#1 and base station BS#2 to control station MCC.

Control station MCC decides a base station after Hand-Over on the basis of the control signal from base station BS#1 and base station BS#2, then obtains a certain information signal. However it has been a problem conventionally that a control station can not exactly decide a base station after DHO Between Cells even by executing DHO Between Cells on the basis of a CRC signal (Cyclic Redundancy Check) that checks data error in a control signal.

Figure 2:
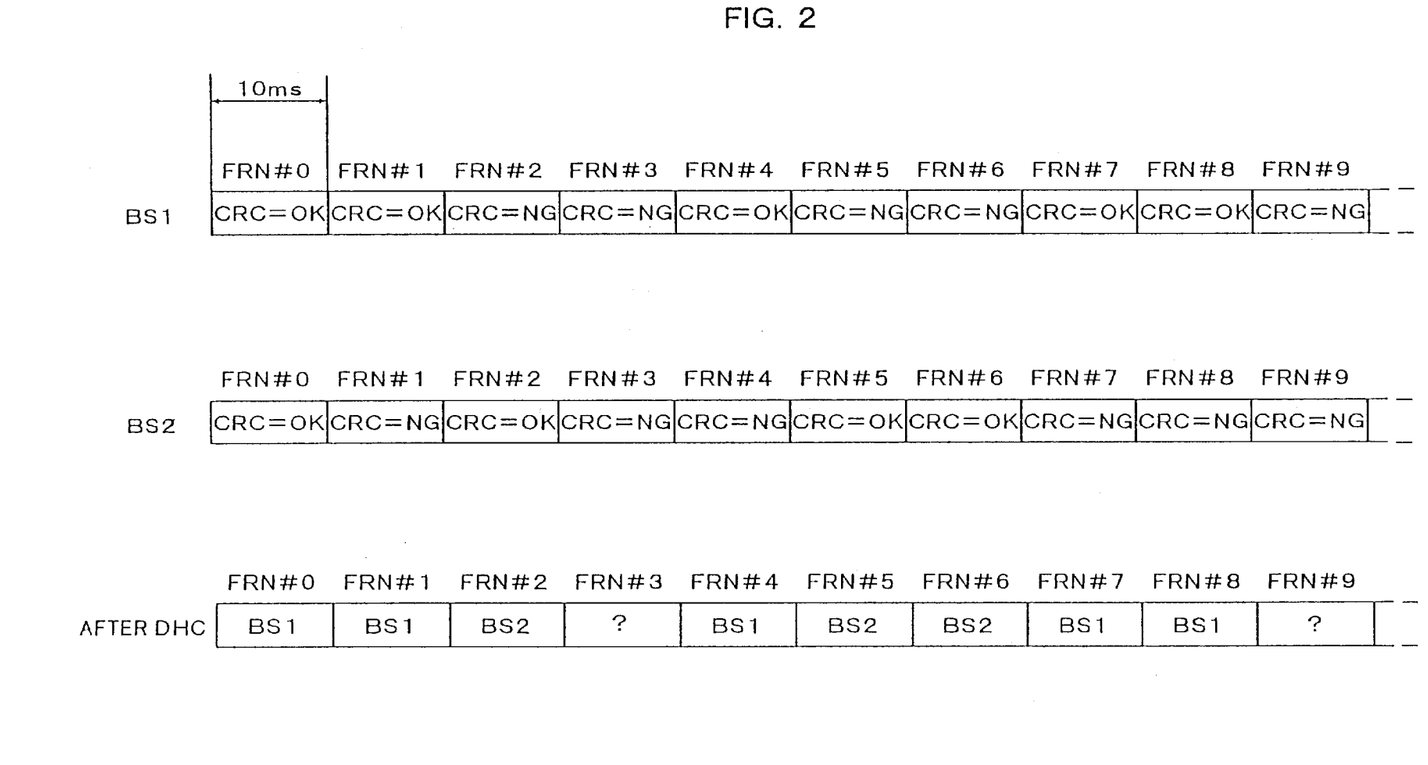
FIG. 2 illustrates frame diagrams to explain the case of selecting a base station on the basis of a CRC signal in DHO Between Cells.

FIG. 2 illustrates frame diagrams at control station MCC in DHO Between Cells on the basis of a CRC signal checking data error in the control signal respectively transmitted from base station BS#1 and base station BS#2 to control station MCC. In FIG. 2, in the case where a CRC signal of a base station is OK and a CRC signal of another base station is NG, for instance, as shown in the frame number 1 (FRN#1) and the frame number 2 (FRN#2), control station MCC can decide a base station after DHO Between Cells simply. On the other hand, in the case where CRC signals of both base stations are both NG signals, for instance, as shown in the frame number 3 (FRN#3) and the frame number 9 (FRN#9), control station MCC can not exactly decide a base station after DHO.

For control station MCC to exactly decide a base station after DHO, methods using information such as reception level, frame error rate, bit error rate, etc. have been conventionally applied. Concretely, in a method using reception level, a base station transmitting a high reception level is selected as a base station after DHO. However it is difficult to exactly decide a base station after DHO on the basis of the above information because there is a case that control information is exactly obtained even when a reception level is low.

DISCLOSURE OF INVENTION

An object of the present invention is to provide a radio communication system in which a control station can exactly decide a base station after DHO Between Cells.

This object is achieved by a radio communication system having a control station comprising a receiving section for receiving a signal including information concerning presence/non-presence of data error in a signal transmitted from each of a plurality of base stations and a base station selecting section for selecting a base station that transmitted a signal including information indicating non-presence of data error.

And, this object is also achieved by a radio communication method comprising a step of receiving a signal including information concerning presence/non-presence of data error in a signal transmitted from each of a plurality of base stations and a step of selecting a base station that transmitted a signal including information indicating non-presence of data error to communicate with the selected base station.

BEST MODE FOR CARRYING OUT THE INVENTION

In a radio communication system of the present invention, in a base station selecting system according to DHO Between Cells in a CDMA mobile communication system in which a service area is divided into each of a plurality of cells respectively divided into each of a plurality of sectors respectively having a base station and a control station controls a plurality of base stations, in the case where a CRC signal obtained from a base station is OK and a CRC signal obtained from another base station is NG, the base station transmitting OK in CRC signal is selected.

In the case where CRC signals obtained from both base stations are both OK signals or both NG signals, a base station transmitting the larger number of "0" symbols in TPC (Transmission power Control) bits, which is reliability information besides CRC signal, is selected.

According to the method described above, a base station after DHO Between Cells is exactly decided, which allows a control station to obtain information signals after DHO Between Cells more exactly than the conventional method.

Further, in the case where CRC signals obtained from both base stations are both OK signals or both NG signals and the numbers of "0" symbols in TPC bits, which is reliability information besides CRC signal, obtained from both base station are the same, a base station is selected on the basis of by past reliability information.

According to the method described above, a base station after DHO Between Cells is exactly decided, which allows a control station to obtain information signals after DHO Between Cells more exactly than the conventional method.

Figure 3:
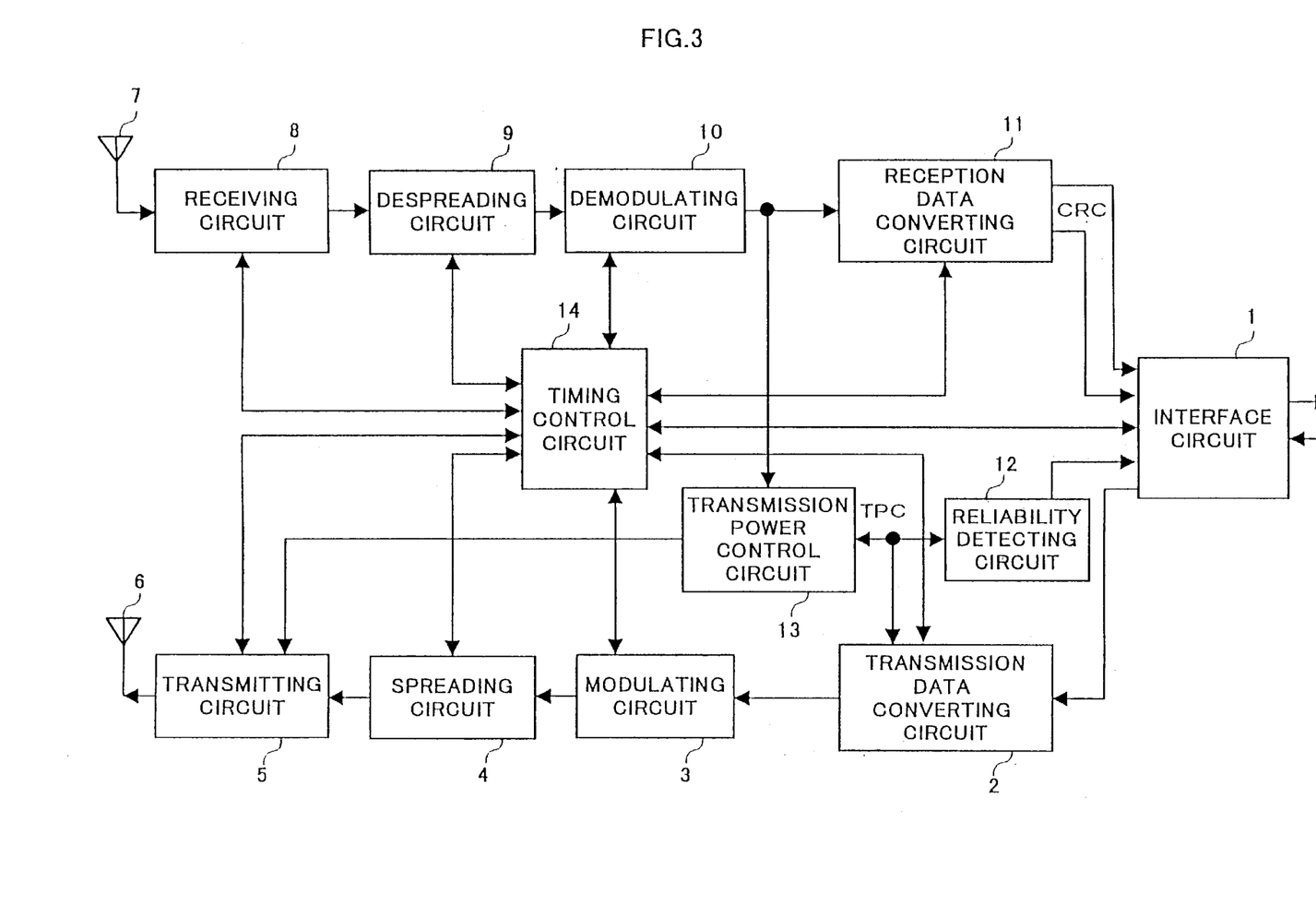
FIG. 3 illustrates a block diagram of a base station BS in a radio communication system in the present invention.
Figure 4:
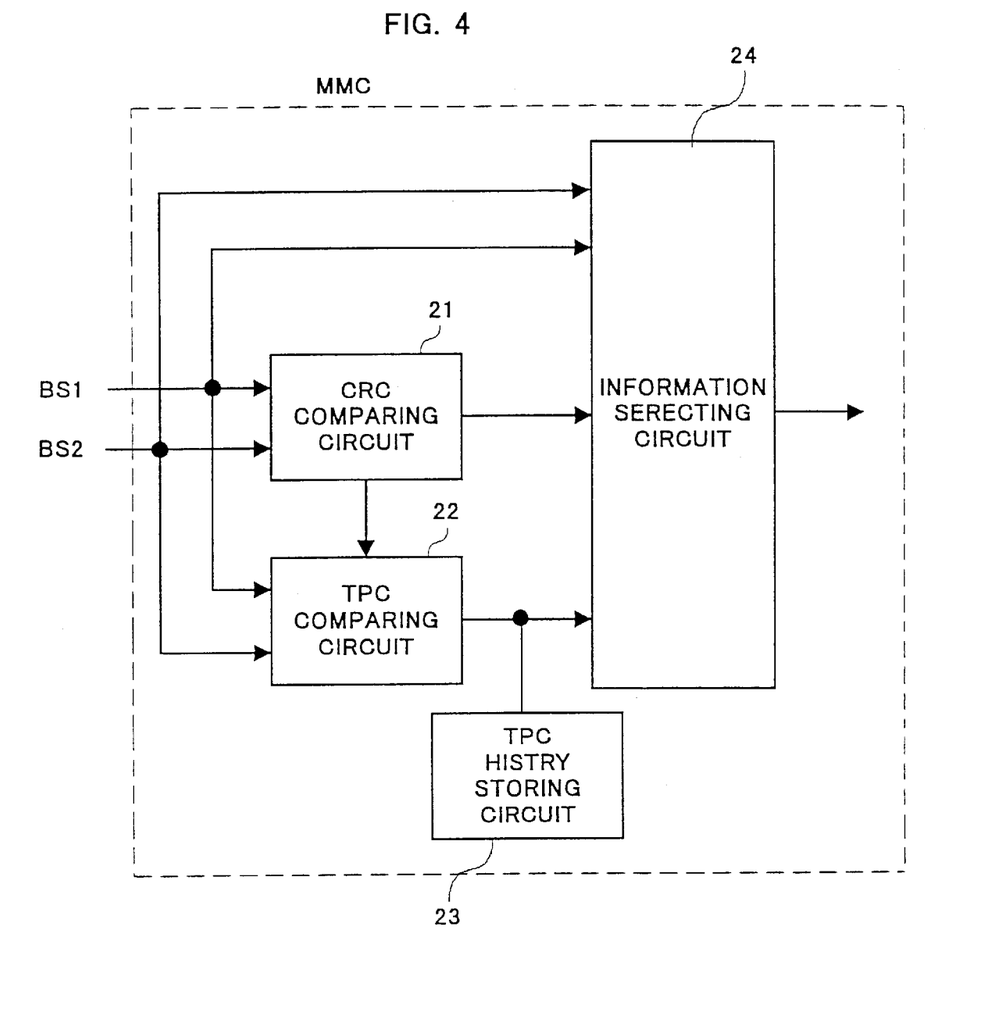
FIG. 4 illustrates a block diagram of control station MCC in a radio communication system in the present invention.

The present invention is explained with reference to accompanying drawing. FIG. 3 is a block diagram illustrating the configuration of base station BS in which DHO Between Cells is executed. FIG. 4 is a block diagram illustrating the configuration of control station MCC in which DHO Between Cells is executed.

As illustrated in FIG. 3, base station BS in DHO Between Cells primarily comprises interface circuit 1 for transmitting and receiving voice and data from and to control station MCC, transmission data converting circuit 2 for constructing input signals in frames and for processing the frames according to CRC coding and error correction coding, modulating circuit 3 for modulating transmission data, spreading circuit 4 for code spreading modulated signals, transmitting circuit 5 for transmitting code spread transmission signals, transmitting antenna 6 as a transmitting member, receiving antenna 7 as a receiving member, receiving circuit 8 for converting reception signals into baseband signals, despreading circuit 9 for detecting correlation values of baseband signals, demodulating circuit 10 for demodulating despread reception data, reception data converting circuit 11 for processing reception data according to CRC detection then error correction decoding, reliability detecting circuit 12 for detecting bit contents in TPC signal, transmission power control circuit 13 for controlling transmission power, and timing control circuit 14 for controlling all of timing and sequence of the apparatus.

In the base station BS having the configuration described above, at a transmitting side, voice or data from control station MCC is first extracted at interface circuit 1, then this data is output to transmission data converting circuit 2. At transmission data converting circuit 2, a pilot signal (PL), a TPC signal, a control signal, etc. are added into an input signal to construct frames, then these frames are processed according to CRC coding and error correction coding.

Next, at modulating circuit 3, CRC coded data is modulated according to some modulating methods. Then, a signal modulated at spreading circuit 4 is code spread, and this resultant signal as a transmission signal is converted into a signal of desired carrier frequency which is transmitted from transmitting antenna 6.

And, at a receiving side, a reception signal at receiving antenna 7 is converted into a baseband signal at receiving circuit 8. Correlation values of this baseband signal are detected at despreading circuit 9. Further, reception data is demodulated according to some kinds of detection methods at modulating circuit 10. Next, the reception data is separated into voice or data and a CRC signal is detected at reception data converting circuit. Separated voice or data is provided to interface circuit 1, then transmitted to control circuit MCC with reliability information from reliability detecting circuit 12.

At transmission power control circuit 13, transmission power and a TPC signal is determined by reception level, etc. on the basis of signals from modulating circuit 10. The TPC signal is transmitted to transmission data converting circuit 2 and reliability detecting circuit 12.

In addition, a TPC signal is indicated normally with 1 bit. "0" symbol of a TPC signal instructs a decrease of transmission power in transmission power control of a closed loop and "1" symbol of a TPC signal instructs an increase of transmission power in transmission power control of a closed loop. Accordingly, continuous "0" signals of TPC signals in transmission power control of a closed loop means that enough reception level is maintained.

Reliability detecting circuit 12 counts the number of "0" symbols of TPC signals from reception power control circuit 13, for instance, over one frame, then outputs the number to interface circuit 1. This TPC signal is used as indication of reliability in transmitting/receiving of data between base station BS and mobile station MS.

Timing circuit 14 controls all timing and sequence in the apparatus.

Next, the configuration of control station MCC for DHO Between Cells is explained using FIG.4.

In FIG. 4, control station MCC in DHO Between Cells primarily comprises CRC comparing circuit 21, TPC comparing circuit 22, TPC history storing circuit 23 and information selecting circuit 24.

Signals from base station BS#1 and base station BS#2 transmitted from interface circuit 1 is respectively separated into information signals and control signals at control station MCC. Each of them is input to CRC comparing circuit 21, TPC comparing circuit 22 and information selecting circuit 24.

CRC comparing circuit 21 compares evaluation results of CRC, i.e. OK signal or NG signal transmitted from base station BS#1 and base station BS#2.

In the case where a CRC signal is OK and another CRC signal is NG, information selecting circuit 24 selects a base station outputting information signals including OK CRC signal and control station MCC intends to obtain information signals from the selected base station.

Then, in the case where both of CRC signals are both OK signals or both NG signals, control station MCC stops selecting a base station on the basis of evaluation results of CRC signals, transmits control signals to TPC comparing circuit 22 and instructs to compare evaluation results of TPC signals by TPC comparing circuit 22.

TPC comparing circuit 22 compares the evaluation results of TPC signals transmitted from base station BS#1 and base station BS#2, i.e. the number of "0" symbols of TPC bits in a certain time, then information selecting circuit selects a base station outputting information signals including the larger number of "0" symbols of TPC bits. Then control station MCC intends to obtain information signals from the selected base station.

And, after comparing the numbers of "0" symbols of TPC bits in a certain time, in the case where the numbers of "0" symbols are the same, the numbers of "0" symbols of TPC signals in earlier several frames are compared. And TPC history is read from TPC history storing circuit 23 and a base station having the larger number of "0" symbols of TPC signals is selected. Control station MCC intends to obtain information signals from the selected base station.

Figure 5:
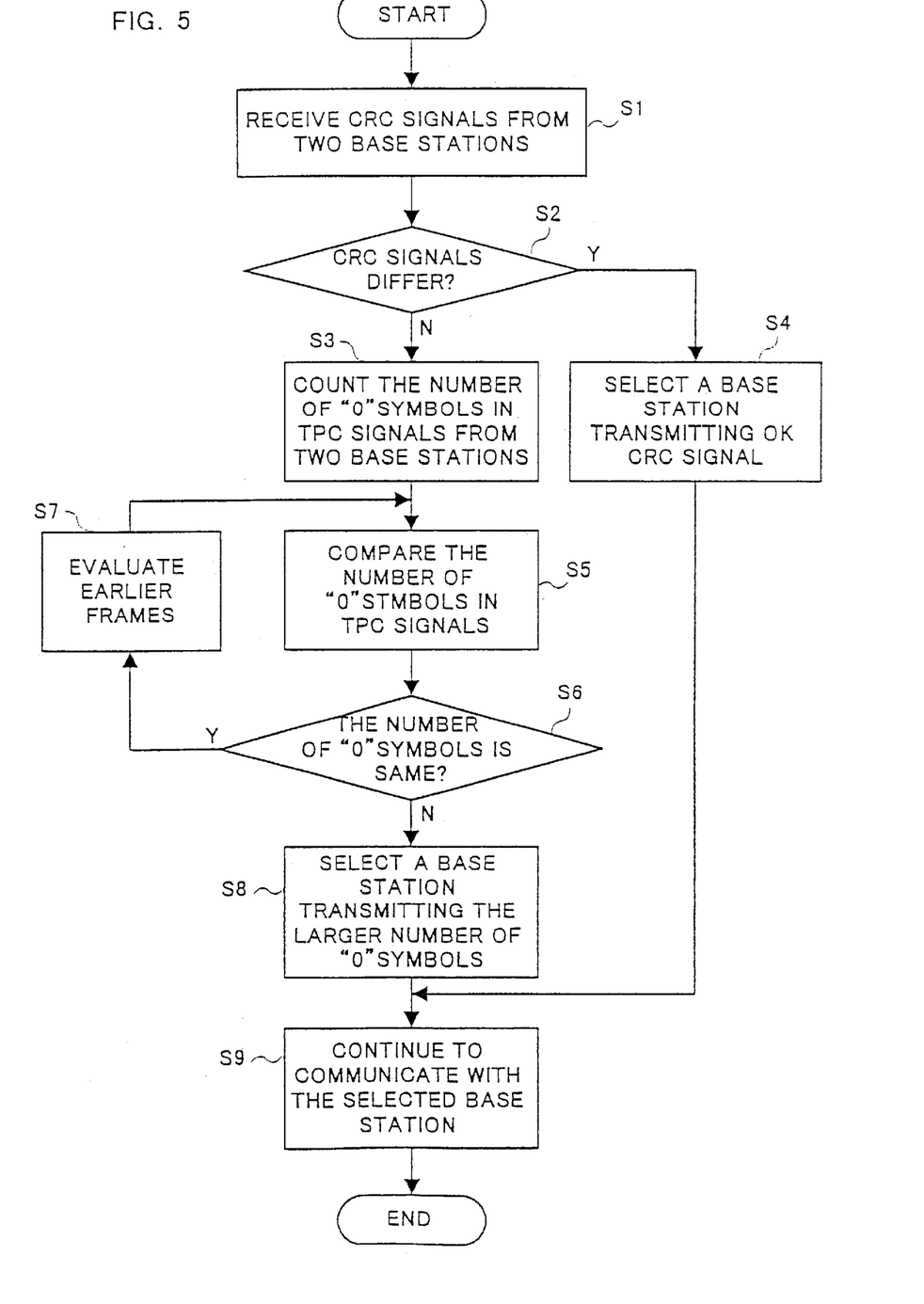
FIG. 5 is a flow chart to explain how to detect a reliability in a radio communication system in the present invention.
Figure 6:
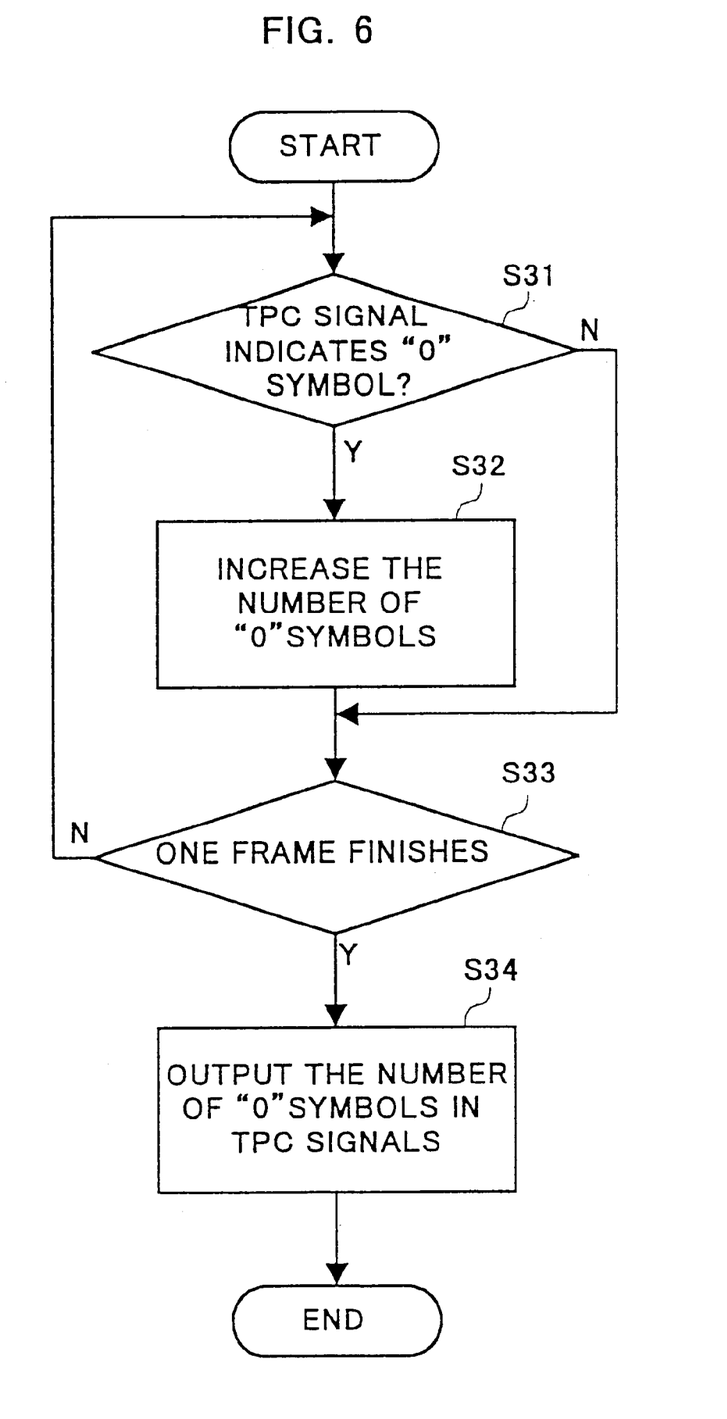
FIG. 6 is a flow chart to explain how to evaluate a TPC signal.

Next, an example of a radio communication system of the present invention is explained using flow charts in FIG. 5 and FIG. 6. First, control station MCC receives CRC signals from two base stations BS#1 and BS#2 (S1) and judges whether these CRC signals differ or not.

In the case where CRC signals from two base stations are the same, i.e. both of them are OK (non-presence of data error) or both of them are NG (presence of data error), TPC signals from signals from two base stations are extracted and the number of "0" symbols of TPC signals in one frame period are counted (S3).

On the other hand, in the case where CRC signals from two base stations differ, i.e. a CRC signal is OK and another CRC signal is NG, the base station having OK CRC signal is selected (S4) and control station MCC continues to communicate with the selected base station (S9).

The case of counting the number of "0" symbols in TPC signals in one frame period is explained using FIG. 6.

First, it is judged whether the first bit of a TPC signal indicates "0" symbol or not (S31). In the case where the bit indicates "0" symbol, the number of "0" symbols is increased (S32).

Next, it is judged whether one frame that is an evaluation period finishes or not (S33). When one frame does not finish, it is judged whether next bit of a TPC signal indicates "0" symbol or not.

In the case of the first bit of a TPC signal does not indicate "0" symbol, it is judged whether one frame that is an evaluation period finishes or not (S33). When one frame does not finish, it is judged whether next bit of a TPC signal indicate "0" symbol or not in the same way as described above.

These operations are repeated until one frame finishes. When one frame finishes, the number of "0" symbols in the counted TPC signals is output to TPC comparing circuit 22 (S34).

Next, as illustrated in FIG. 5, at TPC comparing circuit, the numbers of "0" symbols in TPC signals from both base stations are compared (S5). And it is judged that whether the numbers of "0" symbols in TPC signals of two base stations are the same or not (S6).

In the case where the numbers of "0" symbols in TPC signals of two base stations are not the same, a base station having the larger number of "0" symbols is selected from the two base stations (S8) and control station MCC continues to communicate with the selected base station (S9).

On the other hand, in the case where the numbers of "0" symbols in TPC signals of two base stations are the same, the earlier frame than the already evaluated one is evaluated (S7), the numbers in TPC signals of two base stations are compared and it is judged whether the numbers of "0" symbols in TPC signals of the two base stations are the same or not (S6).

As described above, in the present invention, when CRC signals obtained from two base stations are both OK signals or both NG signals, control station MCC selects a base station having the larger number of "0" symbols in TPC bits that are reliability information besides CRC signal. That makes it possible to exactly decide a base station after DHO, which allows a control station to acquire information singles after DHO Between Cells more exactly than the conventional method.

And, when the numbers of "0" symbols in TPC bits from both base stations are the same, a base station is selected referencing TPC history in earlier several frames. That also makes it possible to exactly decide a base station after DHO, which allows a control station to acquire information singles after DHO Between Cells more exactly than the conventional method.

According to the above, a base station selecting system in which a control station can exactly decide a base station after DHO Between Cells is achieved.

In addition, in the embodiment described above, the case of two base stations is explained, however, the present invention is applicable to the case of base stations more than three.

And, in the embodiment described above, the case of counting the number of "0" symbols of TPC signals in one frame to evaluate is explained, however, in the present invention, it is possible to count the number of "0" symbols of TPC signals in more frames than one to evaluate.

Industrial Applicability

The radio communication system of the present invention is useful in data communication field using radio communication devices such as portable telephone and so on.

What is claimed is:

1. A control system in a radio communication system comprising:
   a receiving circuit that receives signals, each signal including data error information and a transmission power control signal, from a plurality of base stations;
   a first comparing circuit that, upon diversity handover, compares the data error information among the received signals;
   a second comparing circuit that, in the case where said first comparing circuit determines that all data error information is the same state among the received signals, compares the transmission power control signals to one another; and
   a selecting circuit that selects a base station from among said plurality of base stations according to a comparison result of said second comparing circuit.

2. The control station according to claim 1, wherein said selecting circuit selects a base station having the greatest number of transmit power control signals indicating that transmit power is decreased from among said plurality of base stations.

3. The control station according to claim 2, wherein said selecting circuit selects a base station based on a history of the transmit power control signals when a plurality of bases stations each has the greatest number of transmit power control signals indicating that transmit power is decreased.

4. The control station according to claim 3, wherein said selecting circuit selects a base station having the greatest number of transmit power control signals indicating that transmit power is decreased in the history of the transmit power control signals.

5. The control station according to claim 1, wherein said selecting circuit selects a base station having continuous transmit power control signals indicating that transmit power is decreased from among said plurality of base stations.

6. A radio communication method operating at diversity handover, comprising:
   receiving first signals at a plurality of base stations, each first signal including data error information and a transmission power control signal,
   counting a number of the transmission power control signals at each base station;
   transmitting second signals including the counted number of transmission power control signals and the data error information to a control station from each of said plurality of base stations;
   receiving the second signals from the plurality of base stations at the control station;
   comparing the data error information among the received second signals;
   comparing the counted numbers of transmission power control signals among the received second signals when all data error information among the received second signals is the same; and
   selecting a base station based on the comparing of the counted numbers of transmission power controls signals among the received second signals.

7. The radio communication method according to claim 6, wherein said control station selects a base station having the greatest number of transmit power control signals indicating that transmit power is decreased from among said plurality of base stations.

8. The radio communication method according to claim 7, wherein said control station selects a base station based on a history of the transmit power control signals when a plurality of bases stations each has the greatest number of transmit power control signals indicating that transmit power is decreased.

9. The radio communication method according to claim 8, wherein said control station selects a base station having the greatest number of transmit power control signals indicating that transmit power is decreased in the history of the transmit power control signals.

10. The radio communication method according to claim 6, wherein said control station selects a base station having continuous transmit power control signals indicating that transmit power is decreased from among said plurality of base stations.

11. The radio communication method according to claim 6, wherein said control station selects a base station counts the number of transmit power control signals indicating that transmit power is decreased.

\* \* \* \* \*